United States Patent
Nakayama et al.

(10) Patent No.: US 7,750,523 B2
(45) Date of Patent: *Jul. 6, 2010

(54) EMBEDDED MAGNET TYPE MOTOR

(75) Inventors: Takahiro Nakayama, Hamamatsu (JP); Yoshiyuki Takabe, Hamamatsu (JP); Hirotaka Itoh, Kosai (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 125 days.

This patent is subject to a terminal disclaimer.

(21) Appl. No.: 12/030,098

(22) Filed: Feb. 12, 2008

(65) Prior Publication Data
US 2009/0115280 A1 May 7, 2009

(30) Foreign Application Priority Data
Feb. 13, 2007 (JP) .............................. 2007-032544

(51) Int. Cl.
*H02K 1/27* (2006.01)
(52) U.S. Cl. .......................... 310/156.53; 310/156.56; 310/156.57
(58) Field of Classification Search ................................. 310/156.38–156.49, 156.53–156.57, 261.1
See application file for complete search history.

(56) References Cited

U.S. PATENT DOCUMENTS

| | | | | |
|---|---|---|---|---|
| 3,840,763 A * | 10/1974 | Baumann et al. | ....... | 310/156.56 |
| 6,031,311 A * | 2/2000 | Lee | ....... | 310/156.57 |
| 6,441,524 B2 * | 8/2002 | Kaneko et al. | ......... | 310/156.45 |
| 7,321,177 B2 * | 1/2008 | Uchida et al. | ......... | 310/216.019 |
| 7,420,306 B2 | 9/2008 | Park et al. | | |
| 2007/0103024 A1 | 5/2007 | Nakayama et al. | | |
| 2008/0265706 A1 * | 10/2008 | Nakayama et al. | ..... | 310/156.53 |
| 2009/0115280 A1 * | 5/2009 | Nakayama et al. | ..... | 310/156.53 |
| 2009/0230803 A1 * | 9/2009 | Nakayama et al. | ..... | 310/156.56 |

FOREIGN PATENT DOCUMENTS

| | | |
|---|---|---|
| JP | 58-136258 | 8/1983 |
| JP | 08-256441 | 10/1996 |
| JP | 2001-178045 | 6/2001 |
| JP | 2001-211582 | 8/2001 |
| JP | 2001-333553 | 11/2001 |
| JP | 2002-359941 | 12/2002 |
| JP | 2005-051982 | 2/2005 |
| JP | 2005-287299 | 10/2005 |
| JP | 2006-271184 | 10/2006 |

* cited by examiner

*Primary Examiner*—Tran N Nguyen
(74) *Attorney, Agent, or Firm*—Carstens & Cahoon LLP (57) ABSTRACT

A rotor of an embedded magnet type motor is disclosed. A rotor core of the motor includes first accommodation holes and V-shaped accommodation holes. The first accommodation holes extend in radial directions, and the V-shaped accommodation holes protrude radially outward. The rotor core has grooves at positions corresponding to the first accommodation holes on the outer periphery of the rotor core. Each groove has a width as a dimension in the circumferential direction when viewed from the axial direction. Each first magnet has a width as a dimension in the circumferential direction when viewed from the axial direction. The width of the grooves is larger than the width of the first magnets.

6 Claims, 9 Drawing Sheets

EMBEDDED MAGNET TYPE MOTOR

BACKGROUND OF THE INVENTION

The present invention relates to an embedded magnet type motor.

Conventionally, a rotor core of an embedded magnet type motor has a plurality of accommodation holes aligned in the circumferential direction, and the accommodation holes perforate through the rotor core axially. In the accommodation holes, magnets are accommodated.

In the embedded magnet type motor disclosed in Japanese Laid-Open Patent Publication No. 2005-51982, each of a plurality of magnetic poles includes a pair of magnets arranged in a V shape to protrude radially inward. Specifically, when the number of magnetic poles of the embedded magnet type motor is P, the number of magnets is 2 P. With this construction, a higher torque can be realized in comparison with a motor in which one magnet is provided per one magnetic pole.

However, when two magnets are provided per one magnetic pole, the number of parts increases and parts management cost and assembly cost also increase.

In the embedded magnet type motor of the publication described above, an outer bridge is formed between the radially outer end of each accommodation hole for accommodating a magnet and the outer peripheral surface of the rotor core. Two outer bridges are provided per one magnetic pole. Therefore, leakage fluxes passing through the outer bridges are excessive as a whole of the motor. This reduces the effective fluxes of the embedded magnet type motor and obstructs the torque increase.

SUMMARY OF THE INVENTION

An objective of the present invention is to provide an embedded magnet type motor which increases the torque while preventing an increase in the number of parts and reducing leakage fluxes.

To achieve the foregoing objective and in accordance with one aspect of the present invention, an embedded magnet type motor having a rotor is provided. The rotor includes a rotor core having an axial line and a plurality of magnets constituting magnetic poles, the number of which is represented by P. The rotor core has a plurality of accommodation holes arranged in a circumferential direction of the rotor core. The accommodation holes perforate the rotor core along the axial direction of the rotor core. The accommodation holes include first accommodation holes, the number of which is represented by P/2, and V-shaped accommodation holes, the number of which is represented by P/2. The first accommodation holes extend in radial directions of the rotor core. The V-shaped accommodation holes protrude radially outward. The first accommodation holes and the V-shaped accommodation holes are arranged alternately in the circumferential direction. Each V-shaped accommodation hole has a second accommodation hole and a third accommodation hole corresponding to two straight lines forming the V shape. Each first accommodation hole is adjacent to a second accommodation hole on one side in the circumferential direction and adjacent to a third accommodation hole on the other side. The magnets include first magnets disposed in the first accommodation holes, second magnets disposed in the second accommodation holes, and third magnets disposed in the third accommodation holes. Each first magnet and the second magnet adjacent to the same first magnet constitute one magnetic pole. Each first magnet and the third magnet adjacent to the same first magnet constitute another magnetic pole. The rotor core has grooves at positions corresponding to the first accommodation holes on the outer periphery of the rotor core. Each groove has a width as a dimension in the circumferential direction when viewed from the axial direction. Each first magnet has a width as a dimension in the circumferential direction when viewed from the axial direction, and the width of the grooves is larger than the width of the first magnets.

In accordance with another aspect of the present invention, an embedded magnet type motor having a rotor is provided. The rotor includes a rotor core having an axial line and a plurality of magnets constituting magnetic poles, the number of which is represented by P. The rotor core has a plurality of accommodation holes arranged in a circumferential direction of the rotor core. The accommodation holes perforate the rotor core along the axial direction of the rotor core. The accommodation holes include first accommodation holes, the number of which is represented by P/2, and V-shaped accommodation holes, the number of which is represented by P/2. The first accommodation holes extend in radial directions of the rotor core. The V-shaped accommodation holes protrude radially outward. The first accommodation holes and the V-shaped accommodation holes are arranged alternately in the circumferential direction. Each V-shaped accommodation hole has a second accommodation hole and a third accommodation hole corresponding to two straight lines forming the V shape. Each first accommodation hole is adjacent to a second accommodation hole on one side in the circumferential direction and adjacent to a third accommodation hole on the other side. The magnets include first magnets disposed in the first accommodation holes, second magnets disposed in the second accommodation holes, and third magnets disposed in the third accommodation holes. Each first magnet and the second magnet adjacent to the same first magnet constitute one magnetic pole, and each first magnet and the third magnet adjacent to the same first magnet constitute another magnetic pole. The rotor core has hole portions at positions corresponding to the first accommodation holes. The hole portions are radially outside of the first accommodation holes. Each hole portion has a width as a dimension in the circumferential direction when viewed from the axial direction. Each first magnet has a width as a dimension in the circumferential direction when viewed from the axial direction. The width of the hole portions is larger than the width of the first magnets.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

Figure 1A:
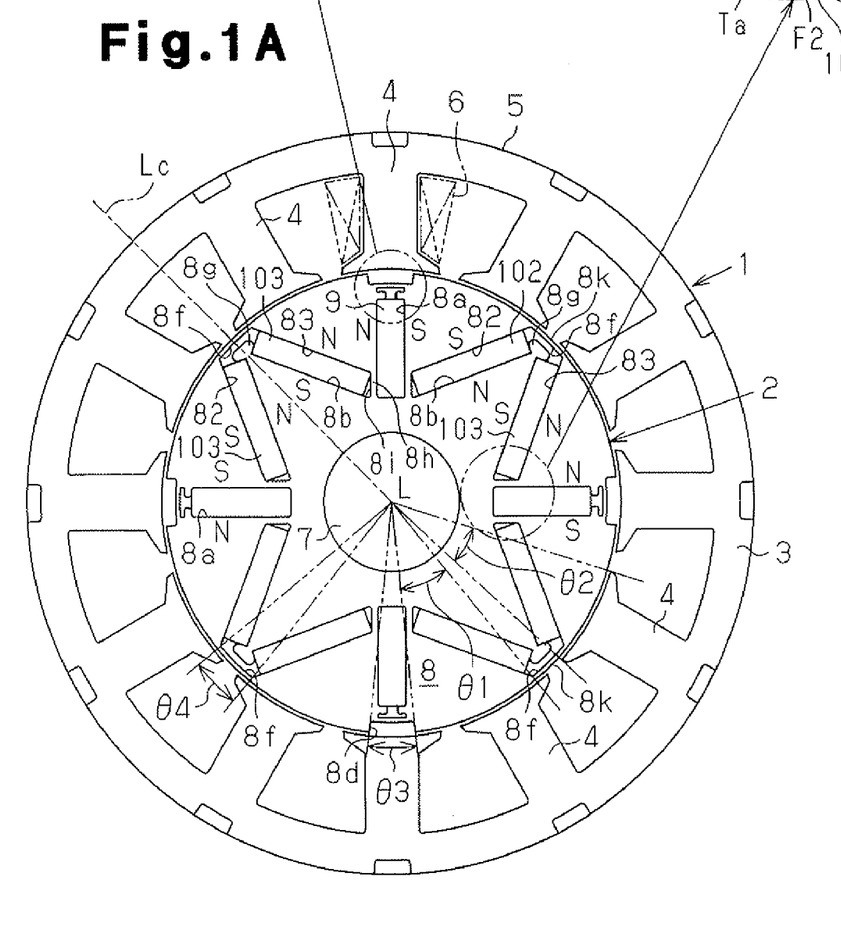
FIG. 1A is a plan view of an embedded magnet type motor according to a first embodiment of the present invention.

Hereinafter, an embodiment of the present invention will be described with reference to FIG. 1A through FIG. 3. As shown in FIG. 1A, an embedded magnet type motor includes a stator 1 and a rotor 2.

Figure 2:
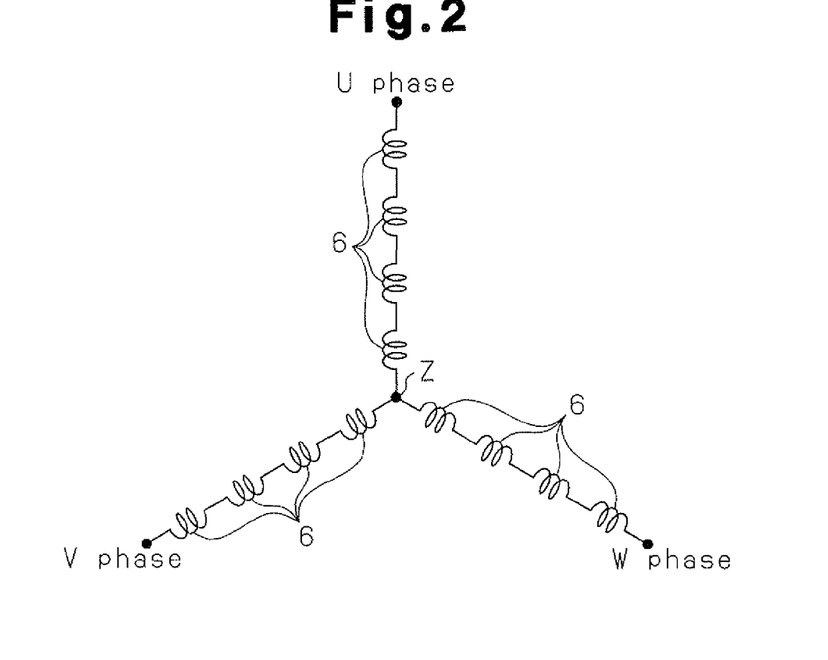
FIG. 2 is a connecting diagram of coils in the motor of FIG. 1A.

The stator 1 is cylindrical as a whole. The stator 1 includes a stator core 5 and a plurality of coils 6. The stator core 5 has a cylindrical portion 3 forming an outer shape and a plurality of teeth 4 arranged at equiangular intervals in the circumferential direction on the inner peripheral surface of the cylindrical portion 3. Each of these teeth extends toward the axial line L of the stator 1 from the inner peripheral surface of the cylindrical portion 3, that is, toward the radially inner side of the cylindrical portion 3. Each of the coils 6 is concentrically wound around a corresponding tooth 4 with an insulator (not shown). In FIG. 1A, one coil 6 is shown by an alternate long and short double-dashed line. The stator core 5 of this embodiment includes twelve teeth 4. As shown in FIG. 2, the stator 1 has a total of three leads corresponding to a U phase, a V phase, and a W phase. Each lead forms four coils 6. Specifically, in each phase, four coils 6 are connected in series. The four coils 6 of each phase are wound around a total of four teeth 4, or every third one of the teeth 4. One end of each of the three leads is connected to a common neutral point Z. AC currents with a phase difference of 120 degrees are supplied to the other ends of the three leads.

The rotor 2 includes a rotary shaft 7, a rotor core 8 fixed to the rotary shaft 7, first magnets 9, the number of which is represented by P/2, second magnets 102, the number of which is represented by P/2, and third magnets 103, the number of which is represented by P/2. "P" indicates the number of magnetic poles of the rotor 2, and in this embodiment, "P" is eight. The second magnets 102 have the same shape as the third magnets 103.

The rotor core 8 is columnar. The rotor core 8 includes a plurality of core sheets laminated in the axial direction. The rotor core 8 has a central hole into which the rotary shaft 7 is fitted. The rotor core 8 is supported rotatably inside the stator 1. The rotor core 8 has a plurality of first accommodation holes 8a and a plurality of V-shaped accommodation holes 8b. Each first accommodation hole 8a accommodates one of the first magnets 9. Each V-shaped accommodation hole 8b accommodates one of the second magnets 102 and one of the third magnets 103. Each first accommodation hole 8a extends in the radial direction of the rotor 2. Each V-shaped accommodation hole 8b has a V shape protrusion toward the radially outer side. The number of first accommodation holes 8b is represented by P/2, that is, four in this embodiment. The number of V-shaped accommodation holes 8b is represented by P/2, that is, four in this embodiment. The first accommodation holes 8a and the V-shaped accommodation holes 8b perforate the rotor core 8 axially. The first accommodation holes 8a and the V-shaped accommodation holes 8b are arranged alternately at equiangular intervals in the circumferential direction of the rotor core 8.

Figure 1B:
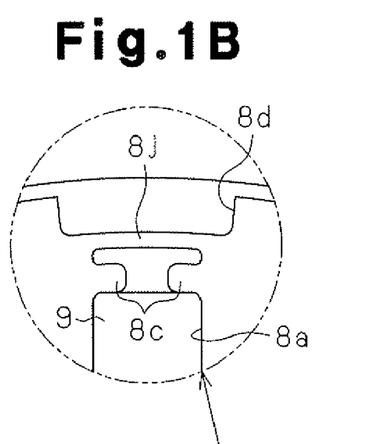
FIG. 1B is a partial cross-sectional view of a radially outer end of a first accommodation hole shown in FIG. 1A.

Near the radially outer end of each first accommodation hole 8a, a pair of projections 8c are provided so as to face each other (refer to FIG. 1B in particular). In each first accommodation hole 8a, a pair of projections 8c extend toward each other in directions orthogonal to the radial direction of the rotor core 8, and reduces the dimension of the first accommodation hole 8a along the direction orthogonal to the radial direction of the rotor core 8, that is, the width of the first accommodation hole 8a to be smaller than other portions. The circumferential dimensions (lengths) of the pair of projections 8c are equal to each other. The pair of projections 8c restricts the radially outward movement of the first magnet 9 accommodated in the corresponding first accommodation hole 8a. The rigidity (flexibility) of the pair of projections 8c makes it easy and reliable to accommodate the first magnet 9 into the first accommodation hole 8a while allowing dimensional accuracy errors of the first magnet 9a and the rotor core 8. At portions that do not correspond to the projections 8c, the width of the first accommodation hole 8a, that is, the dimension in the direction perpendicular to the longitudinal direction of the first accommodation hole 8a is constant.

At positions on the outer periphery of the rotor core 8 corresponding to the first accommodation holes 8a, a plurality of grooves 8d extending in the axial direction of the rotor core 8 are formed. As shown in FIG. 1B, the dimension in the circumferential direction of each groove 8d, that is, the width of the groove 8d is larger than the width of the first magnet 9 disposed in the first accommodation hole 8a. The groove 8d of this embodiment is in a sectoral shape having a constant distance in the circumferential direction from the axis of the rotor core 8.

Each V-shaped accommodation hole 8b includes a second accommodation hole 82, a third accommodation hole 83, and a vertex portion 8f. The second accommodation hole 82 and the third accommodation hole 83 correspond to two straight lines forming the V shape of the V-shaped accommodation hole 8b. The vertex portion 8f connects the radially outer end of the second accommodation hole 82 to the radially outer end of the third accommodation hole 83. The second accommodation hole 82 accommodates the second magnet 102, and the third accommodation hole 83 accommodates the third magnet 103. The pair of second accommodation hole 82 and the third accommodation hole 83 are axisymmetrical about a line Lc extending radially and passing through the vertex portion 8f. Near the radially outer end of each V-shaped accommodation hole 8b, a pair of projections 8g are provided. The pair of projections 8g extend opposite to each other from inner side surfaces Ta and Tb adjacent to each other of the second accommodation hole 82 and the third accommodation hole 83. The projections 8g reduce the widths of the second accommodation hole 82 and the third accommodation hole 83 to be smaller than other portions. Each projection 8g restricts the second magnet 102 or the third magnet 103 from moving radially outward in the corresponding second accommodation hole 82 or third accommodation hole 83. The second accommodation hole 82 and the third accommodation hole 83 extend straight when viewed from the axial direction of the rotor core 8, and have constant widths. In this embodiment, the angle between the second accommodation hole 82 and the third accommodation hole 83 is about 50 degrees. The angular width θ1 between the groove Rd and the radially outer end (that is, the vertex portion 8*f*) of the V-shaped accommodation hole 8*b* adjacent to each other in the circumferential direction is larger than the angular width θ2 of the radially inner end of the teeth 4. The angular width θ3 of the groove 8*d* is equal to the angular width θ4 of the radially outer end (that is, vertex portion 8*f*) of the V-shaped accommodation hole 8*b*. The angular width θ3 of the groove 8*d* is smaller than the angular width θ2 of the radially inner end of the teeth 4.

Figure 1C:
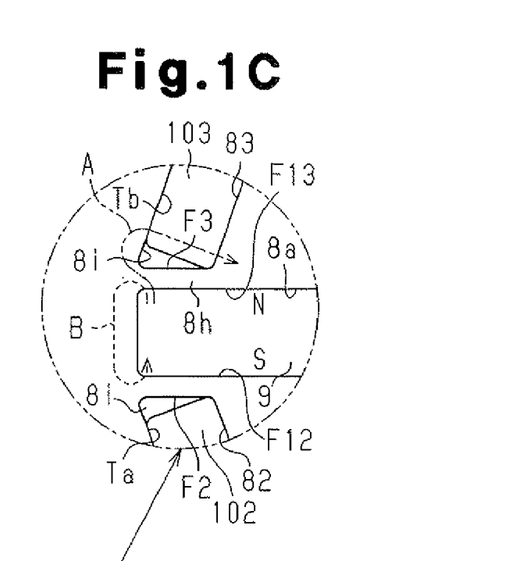
FIG. 1C is a partial cross-sectional view of a radially inner end of the first accommodation hole shown in FIG. 1A.

As shown in FIG. 1C, the radially inner end of the second accommodation hole 82 and the radially inner end of the third accommodation hole 83 are provided with inner wall faces F2 and F3 facing the inner side faces F12 and F13 of the first accommodation hole 8*a* when viewed from the axial direction. Between the inner wall face F2 of the second accommodation hole 82 and the inner side face F12 of the first accommodation hole 8*a* and between the inner wall face F3 of the third accommodation hole 83 and the inner side face F13 of the first accommodation hole 8*a*, an inner bridge 8*h* is provided, respectively. The width of each inner bridge 8*h* is constant when viewed in the axial direction of the rotor core 8. Therefore, at the radially inner end of each of the second accommodation hole 82 and the third accommodation hole 83, a space 8*i* substantially triangular when viewed in the axial direction is formed. In this embodiment, the angle between the second accommodation hole 82 and the first accommodation hole 8*a* is 70 degrees, and the angle between the third accommodation hole 83 and the first accommodation hole 8*a* is also 70 degrees. The rotor core 8 has an outer bridge 8*j* between the radially outer end of the first accommodation hole 8*a* and the outer peripheral surface of the rotor core 8, specifically, the groove 8*d*, and an outer bridge 8*k* between the radially outer end of the V-shaped accommodation hole 8*b*, that is, the vertex portion 8*f* and the outer peripheral surface of the rotor core 8. The radial dimension (thickness) of the outer bridge 8*j* and the radial dimension (thickness) of the outer bridge 8*k* are equal to each other. The thickness of the outer bridge 8*j* and the thickness of the outer bridge 8*k* are circumferentially constant.

First magnets 9 through third magnets 103 are rectangular parallelepipeds, and are magnetized in transverse directions when viewed from the axial direction of the rotor core 8. The south pole of the first magnet 9 accommodated in the first accommodation hole 8*a* and the south pole of the second magnet 102 accommodated in the second accommodation hole 82 adjacent to the first accommodation hole constitute one magnetic pole, that is, a south pole. The north pole of the first magnet 9 accommodated in the first accommodation hole 8*a* and the north pole of the third magnet 103 accommodated in the third accommodation hole 83 adjacent to the first accommodation hole constitute one magnetic pole, that is, a north pole. In the axial direction of the rotor core 8, each of the dimensions of the first magnets 9 through the third magnets 103 are equal to the dimension of the rotor core 8.

The present embodiment has the following advantages.

(1) One first magnet 9 accommodated in each first accommodation hole 8*a* constitutes a part of the north pole and a part of the south pole of the rotor 2. Specifically, one first magnet 9 accommodated in each first accommodation hole 8*a* is shared by two magnetic poles. Therefore, when the number of magnetic poles of the rotor core 8 is represented by P, the rotor core 8 has first magnets 9, the number of which is represented by P/s, second magnets 102, the number of which is represented by P/s, and third magnets 103, the number of which is represented by P/s. That is, the rotor core 8 has magnets, the number of which is represented by (3/2)/P. In the present embodiment, twelve magnets are used and the number of magnetic poles is 8. On the other hand, a rotor core of a conventional embedded magnet type motor requires magnets, the number of which is represented by 2 P. Therefore, in the present embodiment, the number of magnets is reduced. As a result, the number of parts is reduced, and moreover, parts management cost and assembly cost are reduced.

One first accommodation hole 8*a* is shared by two magnetic poles. One outer bridge 8*j* between the radially outer end of the first accommodation hole 8*a* and the outer peripheral surface of the rotor core 8, that is, the groove 8*d*, is shared by two magnetic poles. Therefore, the number of outer bridges in the rotor core 8 is reduced, and leakage fluxes that pass through the outer bridges is reduced.

Figure 3:
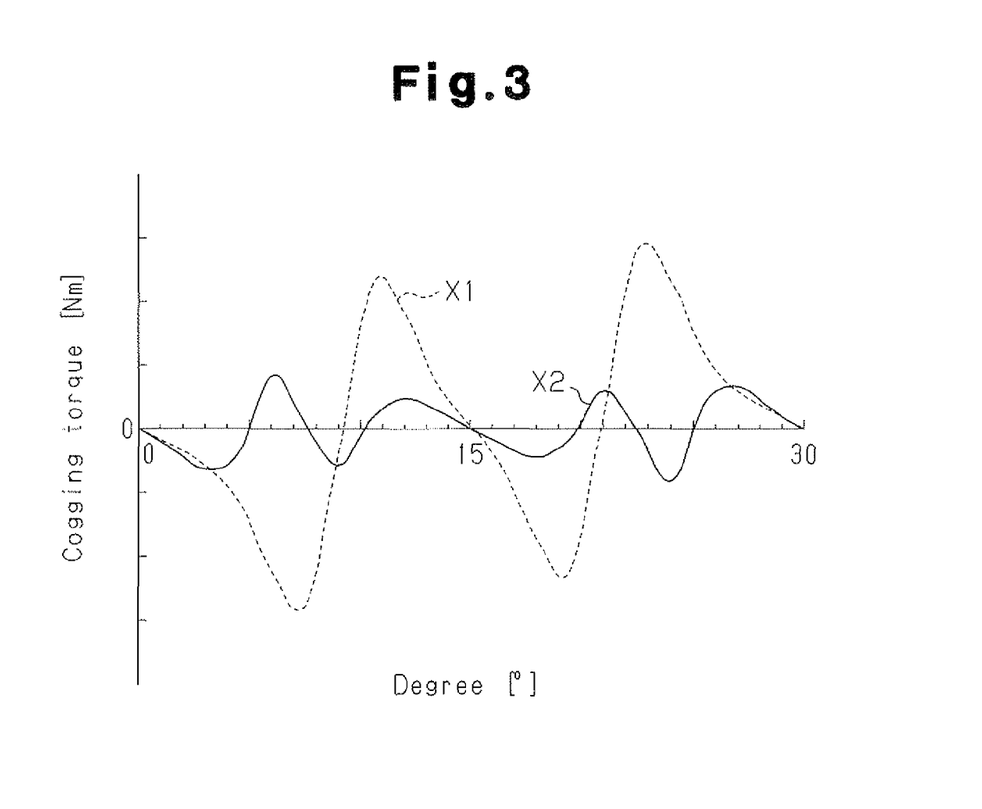
FIG. 3 is a graph showing the relationship between the rotation angle and cogging torque of the rotor in the motor of FIG. 1A.
Figure 4A:
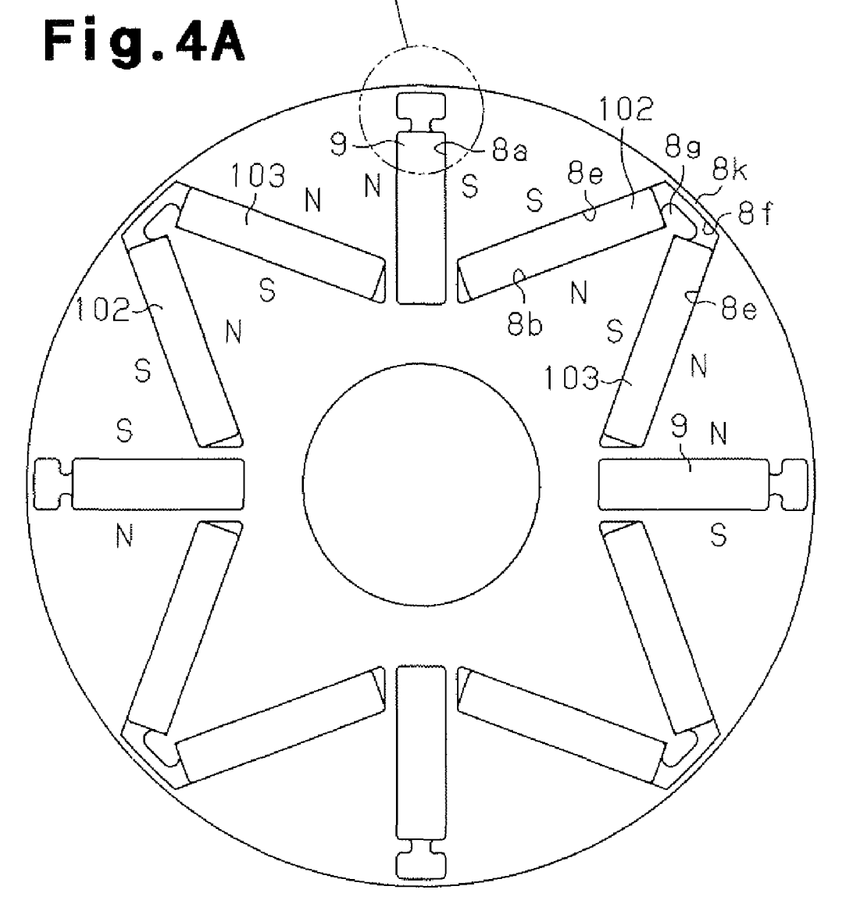
FIG. 4A is a plan view of a rotor on which no groove is formed for comparison with the rotor in the motor of FIG. 1A.
Figure 4B:
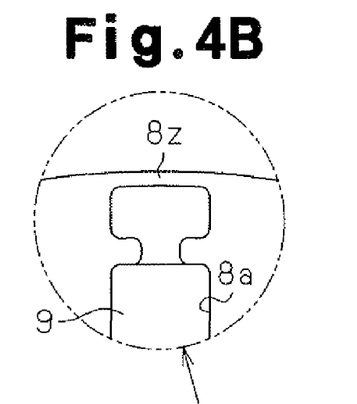
FIG. 4B is a partial enlarged view of FIG. 4A.

At positions corresponding to the respective first accommodation holes 8*a* on the outer periphery of the rotor core 8, grooves 8*d* extending in the axial direction of the rotor core 8 are formed. The circumferential width of each groove 8*d* is larger than the width of the first magnet 9 accommodated in the first accommodation hole 8*a*. Therefore, rapid flux changes between the rotor core 8 and the stator 1 are suppressed. As a result, cogging torque and torque ripple are reduced. FIG. 3 is a graph showing the relationship between the rotation angle and cogging torque of the rotor obtained through experiments. In FIG. 3, the dashed line represents a characteristic line X1 of the rotor (see FIG. 4A) having a rotor core without grooves 8*d*. In the rotor shown in FIG. 4A, as shown in FIG. 4B, the radial dimension (thickness) of the outer bridge 8*z* formed between the radially outer end of the first accommodation hole 8*a* and the outer peripheral surface of the rotor core 8 is the same as that of the outer bridge 8*j* of the embodiment. In FIG. 3, the solid line represents a characteristic line X2 of the rotor 2 in the embodiment. It is understood from FIG. 3 that the cogging torque is reduced in the motor of the embodiment.

(2) The vertex portion 8*f* of the V-shaped accommodation hole 8*b* is a space which connects the radially outer end of the second accommodation hole 82 to the radially outer end of the third accommodation hole 83. Therefore, at the radially outer end of the second accommodation hole 82, the vertex portion 8*f* prevents leakage fluxes which flow out of the north pole of the second magnet 102 and directly goes toward the south pole of the second magnet 102 itself. Similarly, at the radially outer end of the third accommodation hole 83, the vertex portion 8*f* prevents leakage fluxes that flow out of the north pole of the third magnet 103 and directly goes toward the south pole of the third magnet 103 itself.

(3) The inner wall face F2 of the second accommodation hole 82 faces one inner side surface F12 of the first accommodation hole 8*a*, and the inner wall face F3 of the third accommodation hole 83 faces the other inner side surface F13 of the first accommodation hole 8*a*. In other words, as shown in FIG. 1C, the inner wall face F3 of the third accommodation hole 83 faces the flux outflow surface of the first magnet 9, and the inner wall face F2 of the second accommodation hole 82 faces the flux inflow surface of the first magnet 9. Therefore, the distance between the flux outflow surface of the first magnet 9 accommodated in the first accommodation hole 8*a* and the flux inflow surface facing radially inward of the third magnet 103 accommodated in the third accommodation hole 83 is shorter than in a case where straight magnets are simply arranged along radial directions of the rotor core 8. Therefore, as shown by the arrow A of an alternate long and short double-dashed line, magnetic fluxes flowing out from the flux outflow surface of the first magnet 9 easily flow toward the flux inflow surface of the third magnet 103. Similarly, the distance between the flux inflow surface of the first magnet 9 and the flux outflow surface facing radially inward of the second magnet 102 becomes shorter than in a case where straight magnets are simply arranged in the rotor core 8 along the radial directions of the rotor core 8. Therefore, the magnetic fluxes flowing out from the flux outflow surface of the second magnet 102 easily flow toward the flux inflow surface of the first magnet 9. As a result, as shown by the arrow B of the dashed line, leakage fluxes directly toward the south pole of the first magnet 9 from the north pole of the first magnet 9 are reduced. Specifically, effective fluxes in the rotor core 8 increase. Between the second accommodation hole 82 and the first accommodation hole 8a and between the third accommodation hole 83 and the first accommodation hole 8a, an inner bridge 8h having a width constant along the radial direction is provided, so that the width of the inner bridge 8h can be narrowed evenly, and leakage fluxes directly toward the south pole of the first magnet 9 from the north pole of the first magnet 9 are further reduced.

(4) The width of the first accommodation hole 8a except for the projections 8c is constant in the radial direction when viewed from the axial direction of the rotor core 8, and the first magnet 9 accommodated in the first accommodation hole 8a is a rectangular parallelepiped. Therefore, for example, the first magnet 9 is simpler in shape than a magnet that is trapezoid when viewed from the axial direction of the rotor core 8.

(5) The second accommodation hole 82 and the third accommodation hole 83 extend straight. The widths of the second accommodation hole 82 and the third accommodation hole 83 are constant. The second magnet 102 accommodated in the second accommodation hole 82 and the third magnet 103 accommodated in the third accommodation hole 83 are rectangular parallelepipeds. Therefore, the second magnet 102 and the third magnet 103 are simpler in shape than, for example, curved magnets.

(6) The angular width θ1 between the groove 8d and the radially outer end of the V-shaped accommodation hole 8b, that is, the vertex portion 8f adjacent to each other in the circumferential direction is larger than the angular width θ2 of the radially inner end of the tooth 4. Therefore, in comparison with a motor in which the angular width θ1 is smaller than the angular width θ2, the angular width of fluxes that the tooth 4 receives from the rotor 2 is wider, so that higher efficiency is realized.

(7) The angular width θ3 of the groove 8d is smaller than the angular width θ2 of the radially inner end of the tooth 4, so that the radially inner end of the tooth 4 can always be made to face the substantial magnetic pole (outer peripheral portion of the rotor 2 where the groove 8d is not formed) of the rotor 2, whereby the efficiency of the motor is improved.

(8) The radial dimension of the outer bridge 8j is constant in the circumferential direction. The radial dimension of the outer bridge 8k is constant in the circumferential direction. Further, the radial dimension of the outer bridge 8j and the radial dimension of the outer bridge 8k are equal to each other. Therefore, the magnetic resistances and rigidities of the outer bridge 8j and the outer bridge 8k can be made uniform.

The above-described embodiment may be modified as follows.

Figure 5A:
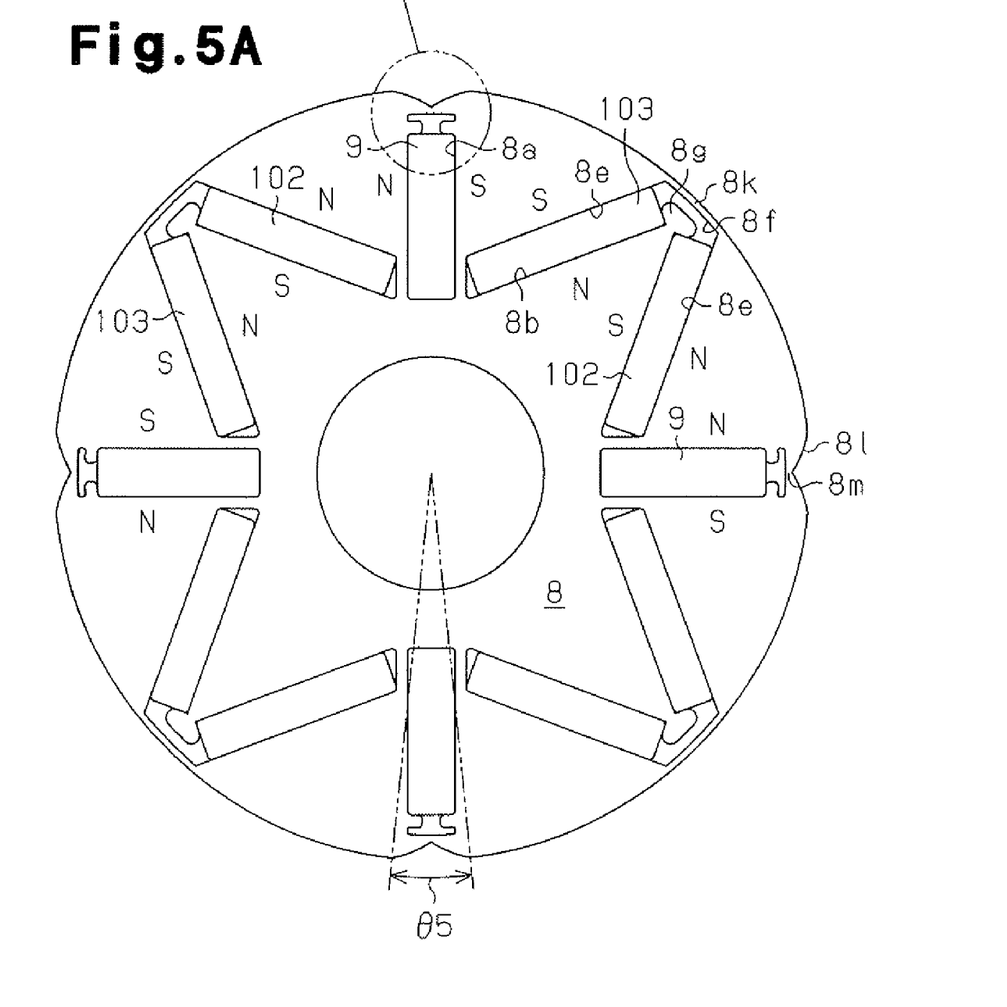
FIG. 5A is a plan view of a rotor of a modification.
Figure 5B:
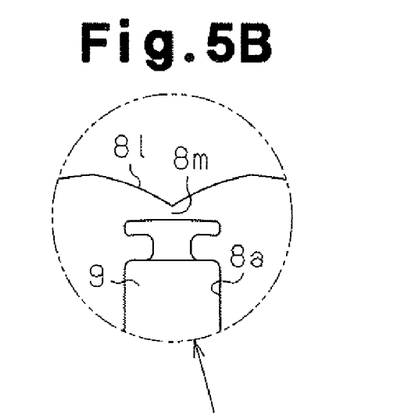
FIG. 5B is a partial enlarged view of FIG. 5A.
Figure 6:
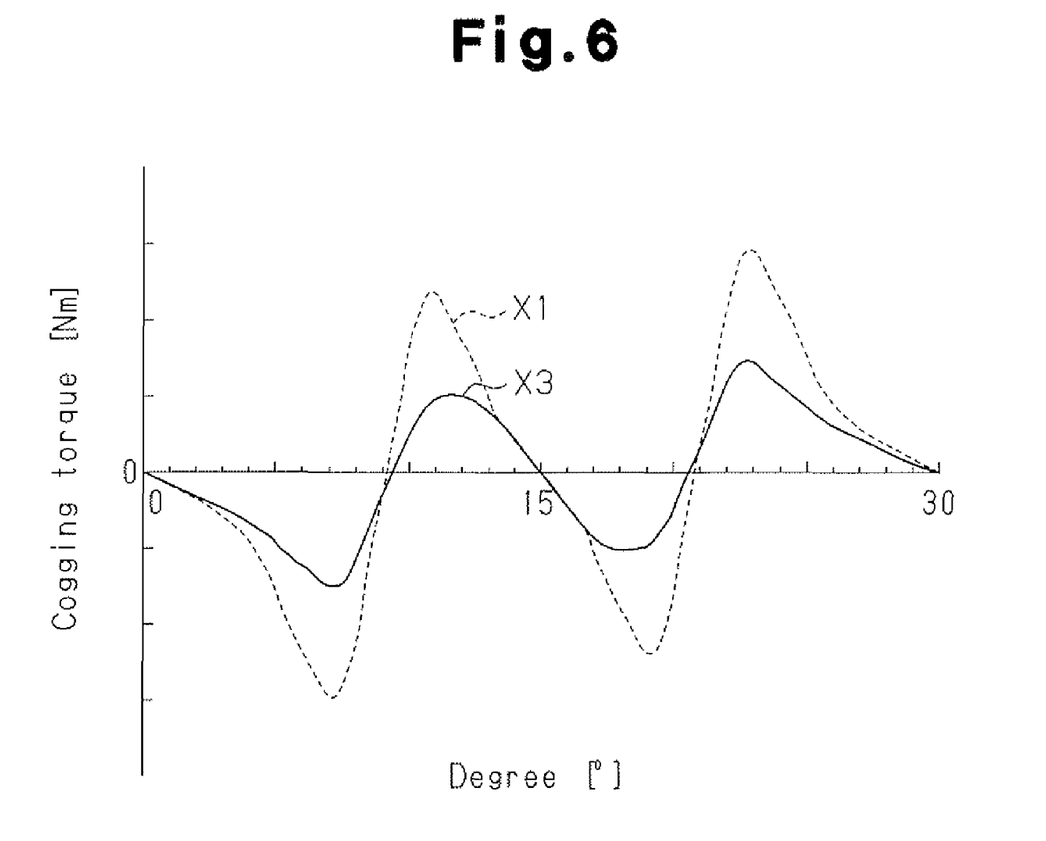
FIG. 6 is a graph showing the relationship between the angle and cogging torque of the rotor of FIG. 5.

In the above-described embodiment, the groove 8d is in a sectoral shape with a constant distance in the circumferential direction from the axis of the rotor core 8, however, it is not limited to this. For example, as shown in FIG. 5A, the groove 8l may be in a shape with a distance from the axis of the rotor core 8 becoming shorter toward a position corresponding to the center in the width direction of the first accommodation hole 8a. In detail, as shown in FIG. 5B, the groove 8l is in a shape curved so that its distance from the axis of the rotor core 8 becomes increasingly shorter toward the position corresponding to the center in the width direction of the first accommodation hole 8a. The angular width θ5 of the groove 8l is set equal to the angular width θ3, θ4 of the above-described embodiment. The thinnest radial dimension of the outer bridge 8m formed between the radially outer end of the first accommodation hole 8a and the outer circumferential surface of the rotor core 8, that is, the groove 8l, is set to be equal to the radial dimension of the outer bridge 8j of the above-described embodiment. The same advantages as the advantages of the above-described embodiment are obtained even with this setting. FIG. 6 is a graph showing the relationship between the rotation angle and cogging torque of the rotor obtained through experiments. In FIG. 6, the solid line represents a characteristic line X3 of the rotor 2 having the rotor core 8 shown in FIG. 5A.

Figure 7A:
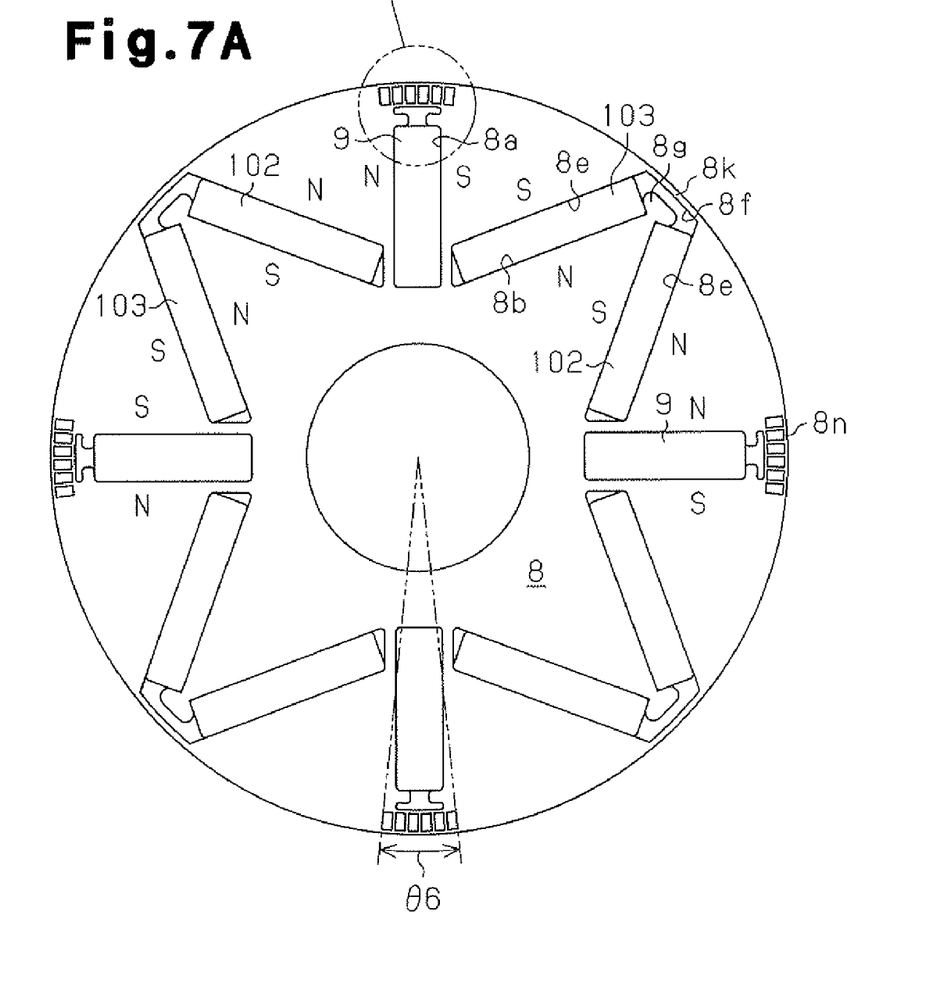
FIG. 7A is a plan view of a rotor according to another modification.
Figure 7B:
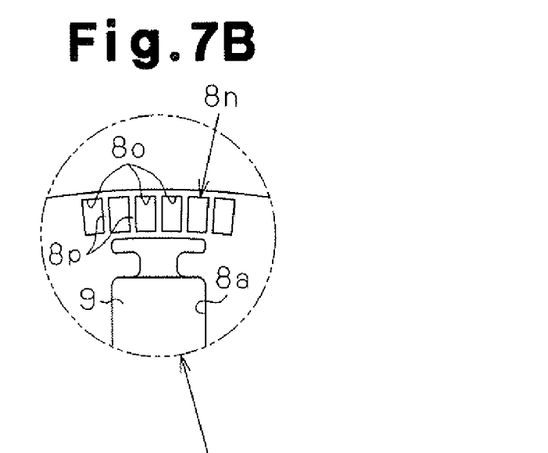
FIG. 7B is a partial enlarged view of FIG. 7A.
Figure 8:
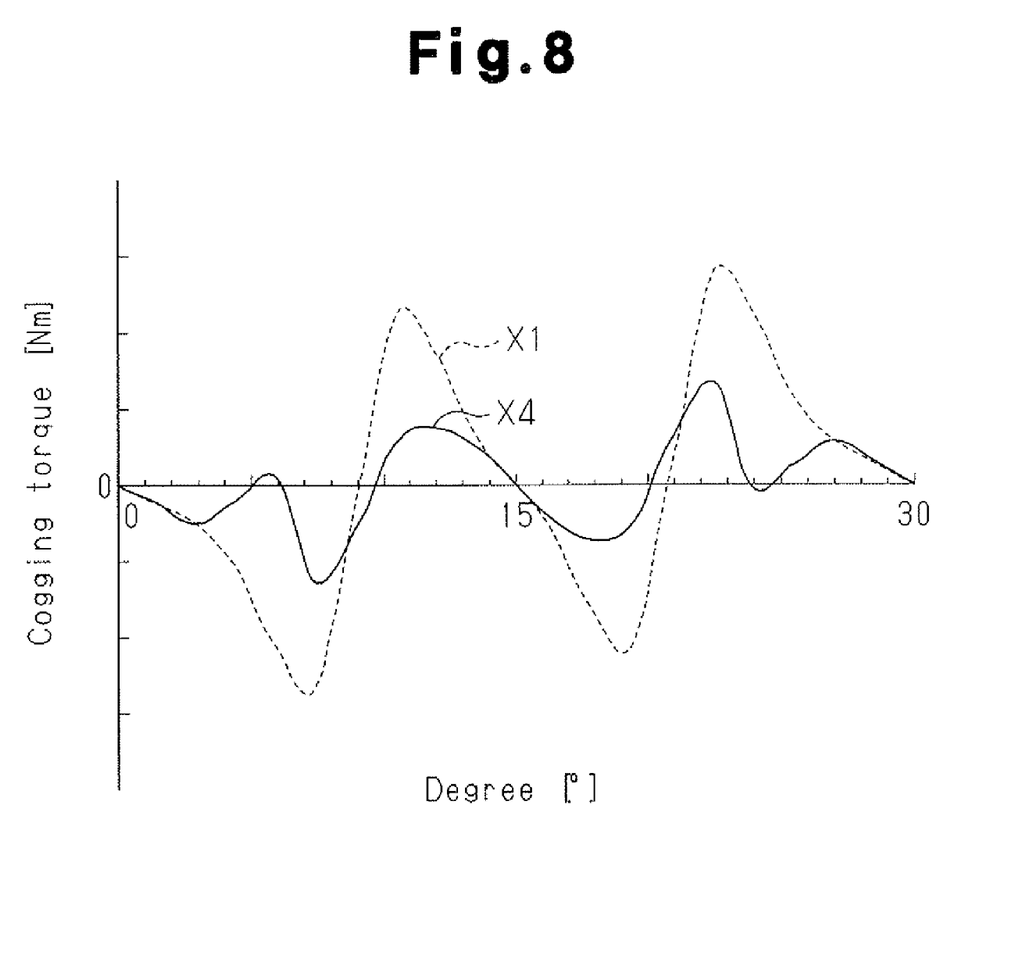
FIG. 8 is a graph showing the relationship between the angle and cogging torque of a rotor in FIG. 7A.

In the above-described embodiment, a plurality of grooves 8d are formed on the outer periphery of the rotor core 8, however, the invention is not limited to this. As shown in FIG. 7A, a hole portion 8n consisting of a plurality of holes 8o aligned along the circumferential direction may be provided radially outside of each first accommodation hole 8a of the rotor core 8. The circumferential dimension as a whole of each hole portion 8n is larger than the width of the magnet 9 accommodated in the first accommodation hole 8a. As shown in FIG. 7B, the hole portion 8n has six holes 8o. The angular width θ6 of each hole portion 8n is set to be equal to the angular width θ3, θ4 of the above-described embodiment. Also in the modification of FIG. 7A, rapid flux changes between the rotor 2 and the stator 1 are suppressed, and cogging torque and torque ripple are reduced. FIG. 8 is a graph showing the relationship between the rotation angle and cogging torque of the rotor obtained through experiments. In FIG. 8, the solid line represents a characteristic line X4 of the rotor having the rotor core 8 shown in FIG. 7A. Between holes 8o adjacent to each other, a dividing bridge 8p is provided, so that high rigidity of the rotor core 8 is maintained. Each hole portion 8n does not necessarily include a plurality of holes 8o, and may include a single hole. In this case, no dividing bridge 8p exists.

Either one of the pair of projections 8c of the first accommodation hole 8a may be omitted.

Figure 9A:
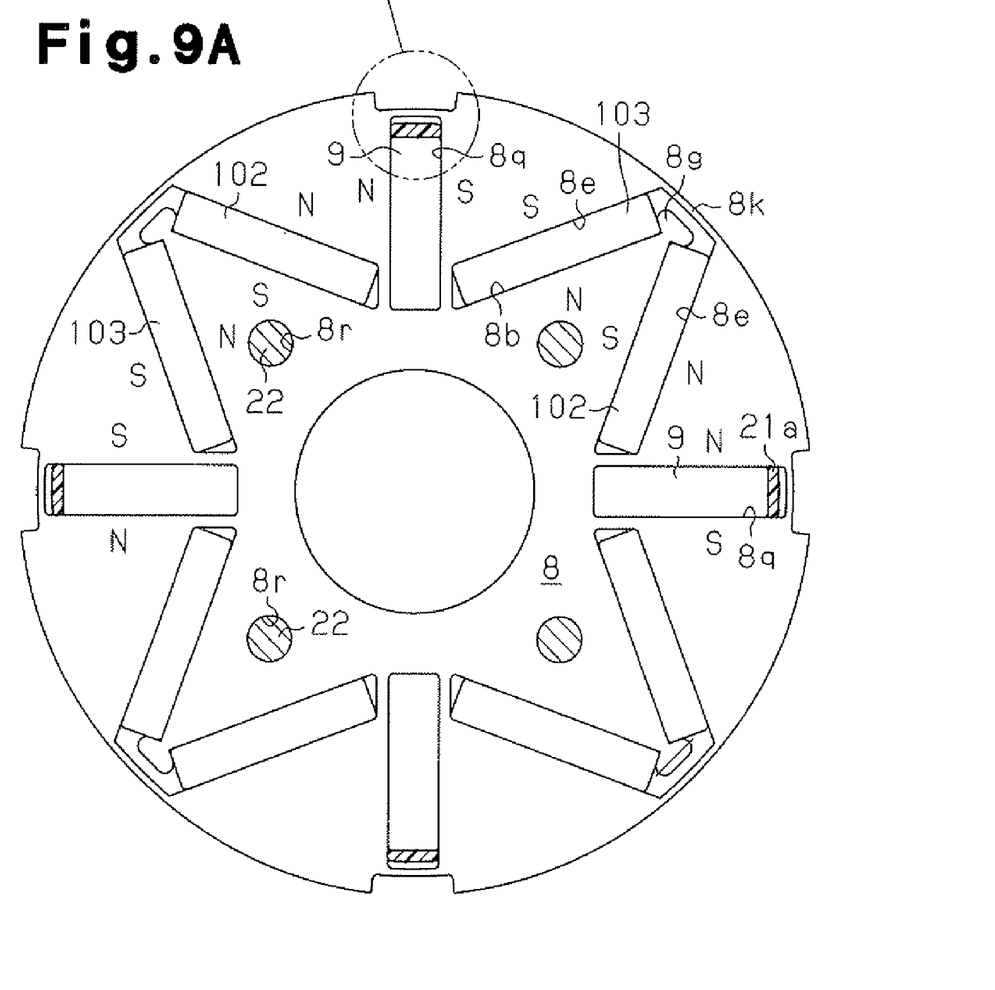
FIG. 9A is a partial cross-sectional view of a rotor according to another modification.
Figure 9B:
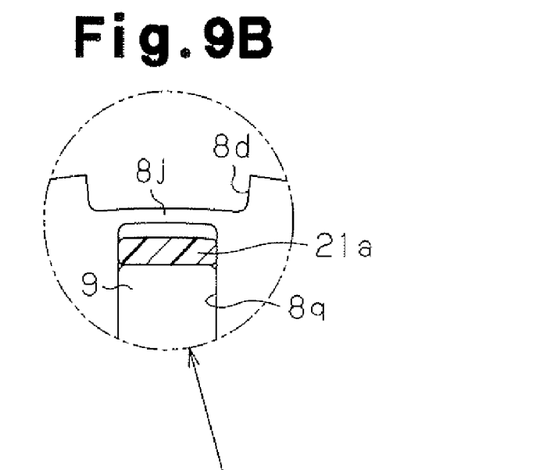
FIG. 9B is a partial enlarged view of FIG. 9A.
Figure 10:
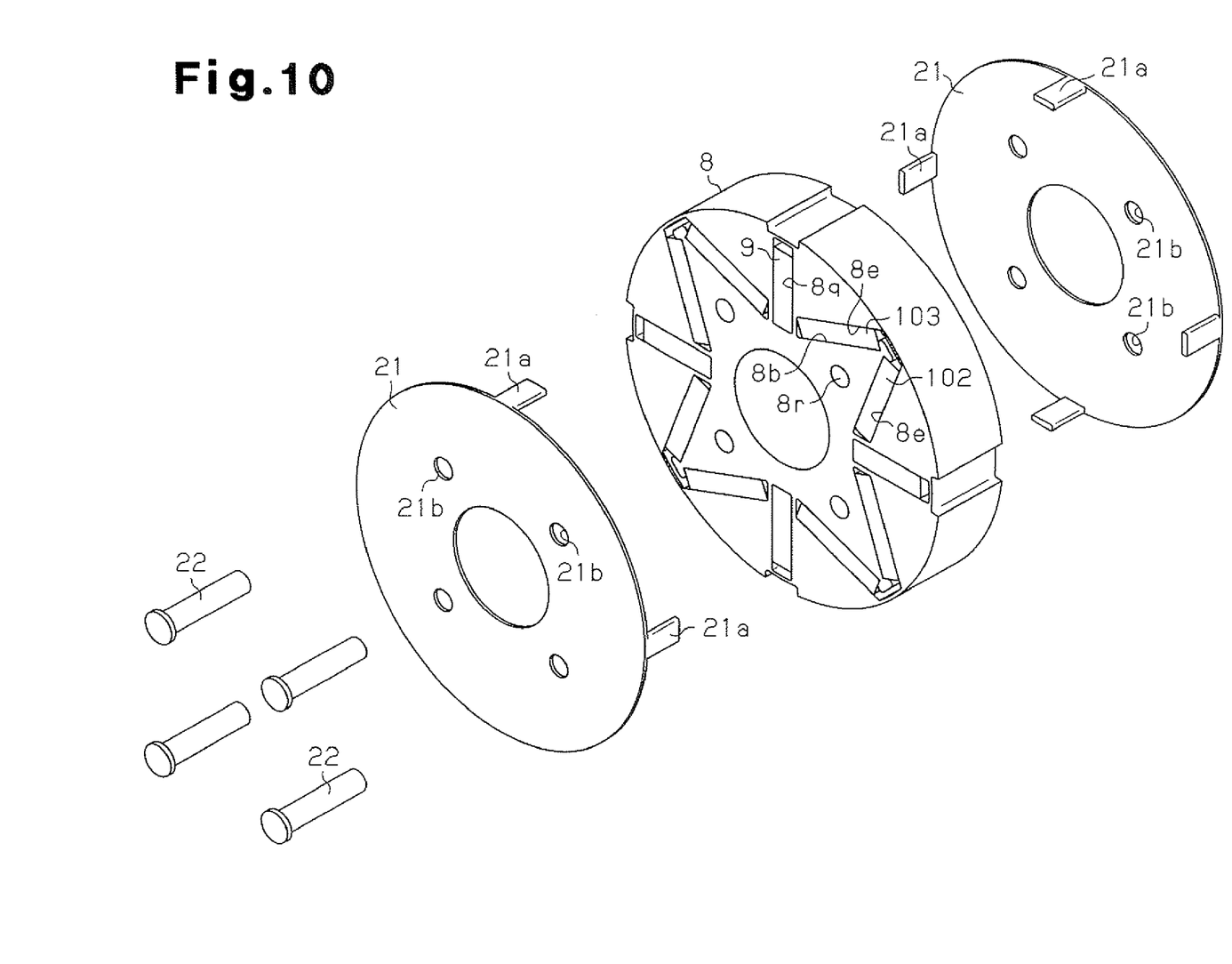
FIG. 10 is an exploded perspective view of a main portion of a rotor according to a further modification.

For example, as shown in FIG. 9A, FIG. 9B, and FIG. 10, the projections 8c of the embodiment may be omitted, and a pair of plates 21 composed of a nonmagnetic material may be fixed to both axial end faces of the rotor core 8 so as to cover the first magnets 9 through the third magnets 103. The pair of plates 21 prevent the first magnets 9 through the third magnets 103 from coming out from the corresponding first accommodation holes 8q through third accommodation holes 83. Each plate 21 has four restricting pieces 21a to be arranged in the first accommodation holes 8q. The restricting pieces 21a restrict radially outward movements of the first magnets 9 by coming into contact with the radially outer ends of the first magnets 9 accommodated in the corresponding first accommodation holes 8q. The rotor core 8 has four fixing through holes 8r. The pair of plates 21 have fixing through holes 21b at positions corresponding to the fixing through holes 8r. The rotor core 8 and the pair of plates 21 are fixed integrally by fastening members (for example, rivets 22) penetrated through the fixing through holes 8r and 21b. Even in this case, the same advantages as that of the above-described embodiment are obtained. When the pair of plates 21 having the restricting pieces 21a are used, leakage flux increase is effectively prevented in comparison with the case where the rotor core 8 is provided with the projections 8c as in the above-described embodiment. In other words, in the above-described embodiment, the rigidity of the pair of projections 8c must be high since a centrifugal force of the corresponding first magnet 9 when rotating is applied thereto, and accordingly, the projections 8c must be made large. The restricting pieces 21a are composed of a nonmagnetic material, so that even if they are made large to increase their rigidities, they do not reduce the magnetic resistance, that is, leakage fluxes do not increase. The projections Sg of the V-shaped accommodation hole 8b in the above-described embodiment may be changed into the restricting pieces formed on the plates 21 as described above.

In the above-described embodiment, the widths of the second accommodation holes 82 and the third accommodation holes 83 are not limited to be constant. The shapes of the second magnet 102 and the third magnet 103 are not limited to substantially rectangular parallelepipeds. For example, the accommodation holes 82 and 83 and the magnets 102 and 103 do not need to have constant widths, or may be curved.

The width of the inner bridge 8h is not limited to be constant, and may change along the radial direction. For example, the space 8i of the above-described embodiment does not need to be provided.

In the above-described embodiment, the inner wall face F2 of the second accommodation hole 82 faces the flux inflow surface of the first magnet 9 accommodated in the first accommodation hole 8a, and the inner wall face F3 of the third accommodation hole 83 faces the flux outflow surface of the first magnet 9, however, the invention is not limited to this. The inner wall face F2 of the second accommodation hole 82 does not need to face the flux inflow surface of the first magnet 9, and the inner wall face F3 of the third accommodation hole 83 does not need to face the flux outflow surface of the first magnet 9.

In the above-described embodiment, the width of the first accommodation hole 8a except for the projections 8c is constant, and the first magnet 9 accommodated in the first accommodation hole 8a is a rectangular parallelepiped. However, the shapes and widths of the first accommodation hole 8a and the first magnet 9 may be changed.

In the above-described embodiment, each V-shaped accommodation hole 8b has the vertex portion 8f which connects the radially outer end of the second accommodation hole 82 and the radially outer end of the third accommodation hole 83, however, the invention is not limited to this. The vertex portion 8f does not need to be provided, and each second accommodation hole 82 and third accommodation hole 83 do not need to be connected to each other, but may be independent from each other.

In the above-described embodiment, the angular width θ1 between the groove 8d and the radially outer end of the V-shaped accommodation hole 8b, that is, the vertex portion 8f, is larger than the angular width θ2 of the radially inner end of the tooth 4. However, the angular width θ1 may be smaller than the angular width θ2.

In the above-described embodiment, the radial thicknesses of the outer bridge 8j and the outer bridge 8k are constant, however, the invention is not limited to this. For example, the thickness of at least either one of the outer bridge 8j and the outer bridge 8k may be changed in the circumferential direction. The thickness of the outer bridge 8j may be made different from the thickness of the outer bridge 8k.

In the axial direction of the rotor core 8, the dimensions of the first magnets 9 through the third magnets 103 may be set to be smaller than the dimension of the rotor core 8. In this case, the first magnets 9 through the third magnets 103 may be restricted from moving axially by accommodating nonmagnetic bodies in gaps containing no magnets in the first accommodation holes 8a, the second accommodation holes 82, and the third accommodation holes 83. In the axial direction of the rotor core 8, the dimensions of the first magnets 9 through the third magnets 103 may be made different from each other.

The first magnets 9 through the third magnets 103 and the rotor core 8 may be divided into a plurality of pieces in the axial direction, and the divided members may be arranged while shifting them circumferentially. In this case, the rapid flux that flows between the stator 1 and the rotor 2 can be further reduced, so that cogging torque and torque ripple are further reduced.

The first accommodation holes 8a may be slightly inclined with respect to the radial directions. In this case, the angular width between the radially outer end of the first accommodation hole 8a and the radially outer end of the second accommodation hole 82 may be made different from the angular width between the radially outer end of the first accommodation hole 8a and the radially outer end of the third accommodation hole 83. The first magnets 9 to be accommodated in the first accommodation holes 8a are slightly inclined with respect to the radial directions.

The second accommodation hole 82 and the third accommodation hole 83 of the V-shaped accommodation hole 8b are not limited to be axisymmetrical about the line Lc extending radially and passing through the vertex portion 8f, but may be asymmetric. For example, the angular width between the radially outer end of the second accommodation hole 8S and the groove 8d adjacent to each other in the circumferential direction may be changed with respect to the angular width between the radially outer end of the third accommodation hole 83 circumferentially adjacent to this second accommodation hole 82 and the groove 8d circumferentially adjacent to this third accommodation hole 83. According to the change of the second accommodation hole 82 and the third accommodation hole 83, the sizes and shapes of the second magnet 102 and the third magnet 103 may be changed.

The rotor core 8 is not limited to an axial lamination structure of core sheets 11, and may be a sintered core obtained by sintering, for example, magnetic powder.

The number of teeth 4, the number of magnetic poles, and the numbers of first magnets 9 through third magnets 103 may be changed.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

What is claimed is:

1. An embedded magnet motor, comprising a rotor, wherein the rotor includes a rotor core having an axial line and a plurality of magnets constituting magnetic poles, the number of which is represented by P, wherein the rotor core has a plurality of accommodation holes arranged in a circumferential direction of the rotor core, wherein the accommodation holes perforate the rotor core along the axial direction of the rotor core, wherein the accommodation holes include first accommodation holes, the number of which is represented by P/2, and V-shaped accommodation holes, the number of which is represented by P/2, the first accommodation holes extending in radial directions of the rotor core, the V-shaped accommodation holes protruding radially outward, wherein the first accommodation holes and the V-shaped accommodation holes are arranged alternately in the circumferential direction, each V-shaped accommodation hole has a second accommodation hole and a third accommodation hole corresponding to two straight lines forming the V shape, and each first accommodation hole is adjacent to a second accommodation hole on one side in the circumferential direction and adjacent to a third accommodation hole on the other side, wherein the magnets include first magnets disposed in the first accommodation holes, second magnets disposed in the second accommodation holes, and third magnets disposed in the third accommodation holes, and each first magnet and the second magnet adjacent to the same first magnet constitute one magnetic pole, and each first magnet and the third magnet adjacent to the same first magnet constitute another magnetic pole, and wherein the rotor core has grooves at positions corresponding to the first accommodation holes on the outer periphery of the rotor core, each groove has a width as a dimension in the circumferential direction when viewed from the axial direction, each first magnet has a width as a dimension in the circumferential direction when viewed from the axial direction, and the width of the grooves is larger than the width of the first magnets, and wherein, in each first accommodation hole, a projection extending in a direction orthogonal to a radial direction of the rotor core is provided, and wherein each projection restricts the first magnet accommodated in the corresponding first accommodation hole from moving radially outward.

2. An embedded magnet motor, comprising a rotor, wherein the rotor includes a rotor core having an axial line and a plurality of magnets constituting magnetic poles, the number of which is represented by P, wherein the rotor core has a plurality of accommodation holes arranged in a circumferential direction of the rotor core, wherein the accommodation holes perforate the rotor core along the axial direction of the rotor core, wherein the accommodation holes include first accommodation holes, the number of which is represented by P/2, and V-shaped accommodation holes, the number of which is represented by P/2, the first accommodation holes extending in radial directions of the rotor core, the V-shaped accommodation holes protruding radially outward, wherein the first accommodation holes and the V-shaped accommodation holes are arranged alternately in the circumferential direction, each V-shaped accommodation hole has a second accommodation hole and a third accommodation hole corresponding to two straight lines forming the V shape, and each first accommodation hole is adjacent to a second accommodation hole on one side in the circumferential direction and adjacent to a third accommodation hole on the other side, wherein the magnets include first magnets disposed in the first accommodation holes, second magnets disposed in the second accommodation holes, and third magnets disposed in the third accommodation holes, and each first magnet and the second magnet adjacent to the same first magnet constitute one magnetic pole, and each first magnet and the third magnet adjacent to the same first magnet constitute another magnetic pole, and wherein the rotor core has grooves at positions corresponding to the first accommodation holes on the outer periphery of the rotor core, each groove has a width as a dimension in the circumferential direction when viewed from the axial direction, each first magnet has a width as a dimension in the circumferential direction when viewed from the axial direction, and the width of the grooves is larger than the width of the first magnets, and wherein the embedded magnet motor further comprises a plate covering an axial end face of the rotor core, and the plate has a plurality of restricting pieces extending toward the accommodation holes of the rotor core, and the restricting pieces restrict the first magnets accommodated in the corresponding first accommodation holes from moving radially outward in a state where the restricting pieces are accommodated in the first accommodation holes.

3. The embedded magnet motor according to claim 2, wherein the restricting pieces are made of a nonmagnetic material.

4. An embedded magnet motor, comprising a rotor, wherein the rotor includes a rotor core having an axial line and a plurality of magnets constituting magnetic poles, the number of which is represented by P, wherein the rotor core has a plurality of accommodation holes arranged in a circumferential direction of the rotor core, wherein the accommodation holes perforate the rotor core along the axial direction of the rotor core, wherein the accommodation holes include first accommodation holes, the number of which is represented by P/2, and V-shaped accommodation holes, the number of which is represented by P/2, the first accommodation holes extending in radial directions of the rotor core, the V-shaped accommodation holes protruding radially outward, wherein the first accommodation holes and the V-shaped accommodation holes are arranged alternately in the circumferential direction, each V-shaped accommodation hole has a second accommodation hole and a third accommodation hole corresponding to two straight lines forming the V shape, and each first accommodation hole is adjacent to a second accommodation hole on one side in the circumferential direction and adjacent to a third accommodation hole on the other side, wherein the magnets include first magnets disposed in the first accommodation holes, second magnets disposed in the second accommodation holes, and third magnets disposed in the third accommodation holes, and each first magnet and the second magnet adjacent to the same first magnet constitute one magnetic pole, and each first magnet and the third magnet adjacent to the same first magnet constitute another magnetic pole, and wherein the rotor core has hole portions at positions corresponding to the first accommodation holes, the hole portions being radially outside of the first accommodation holes, and each hole portion has a width as a dimension in the circumferential direction when viewed from the axial direction, each first magnet has a width as a dimension in the circumferential direction when viewed from the axial direction, and the width of the hole portions is larger than the width of the first magnets, and wherein, in each first accommodation hole, a projection extending in a direction orthogonal to a radial direction of the rotor core is provided, and wherein each projection restricts the first magnet accommodated in the corresponding accommodation hole from moving radially outward.

5. An embedded magnet motor, comprising a rotor, wherein the rotor includes a rotor core having an axial line and a plurality of magnets constituting magnetic poles, the number of which is represented by P, wherein the rotor core has a plurality of accommodation holes arranged in a circumferential direction of the rotor core, wherein the accommodation holes perforate the rotor core along the axial direction of the rotor core, wherein the accommodation holes include first accommodation holes, the number of which is represented by P/2, and V-shaped accommodation holes, the number of which is represented by P/2, the first accommodation holes extending in radial directions of the rotor core, the V-shaped accommodation holes protruding radially outward, wherein the first accommodation holes and the V-shaped accommodation holes are arranged alternately in the circumferential direction, each V-shaped accommodation hole has a second accommodation hole and a third accommodation hole corresponding to two straight lines forming the V shape, and each first accommodation hole is adjacent to a second accommodation hole on one side in the circumferential direction and adjacent to a third accommodation hole on the other side, wherein the magnets include first magnets disposed in the first accommodation holes, second magnets disposed in the second accommodation holes, and third magnets disposed in the third accommodation holes, and each first magnet and the second magnet adjacent to the same first magnet constitute one magnetic pole, and each first magnet and the third magnet adjacent to the same first magnet constitute another magnetic pole, and wherein the rotor core has hole portions at positions corresponding to the first accommodation holes, the hole portions being radially outside of the first accommodation holes, and each hole portion has a width as a dimension in the circumferential direction when viewed from the axial direction, each first magnet has a width as a dimension in the circumferential direction when viewed from the axial direction, and the width of the hole portions is larger than the width of the first magnets, and wherein the embedded magnet motor further comprises a plate covering an axial end face of the rotor core, and the plate has a plurality of restricting pieces extending toward the first accommodation holes of the rotor core, and the restricting pieces restrict the first magnets accommodated in the corresponding first accommodation holes from moving radially outward in a state where the restricting pieces are accommodated in the corresponding first accommodation holes.

6. The embedded magnet motor according to claim 5, wherein the restricting pieces are made of a nonmagnetic material.

\* \* \* \* \*